United States Patent [19]

Drelich et al.

[11] E Re. 28,957

[45] Reissued Sept. 7, 1976

[54] SYNTHETIC RESIN COMPOSITIONS AND METHODS OF UTILIZING THE SAME

[75] Inventors: Arthur H. Drelich, Plainfield; George J. Lukacs, Perth Amboy, both of N.J.

[73] Assignee: Johnson & Johnson, New Brunswick, N.J.

[22] Filed: May 8, 1975

[21] Appl. No.: 575,560

Related U.S. Patent Documents

Reissue of:

[64] Patent No.: 3,849,173
Issued: Nov. 19, 1974
Appl. No.: 260,613
Filed: June 7, 1972

[52] U.S. Cl. ..... 427/331; 260/29.6 M; 260/29.6 MM; 260/29.6 RW; 260/29.7 M; 260/29.7 N; 427/283; 427/288; 427/322; 427/324; 427/340; 427/341; 427/342; 428/198; 428/290

[51] Int. Cl.[2] ..... B05D 3/10; B32B 23/02; B32B 27/02

[58] Field of Search ..... 427/340, 331, 243, 283, 427/288, 341, 342, 322, 324; 428/198, 290; 260/29.6 MM, 29.7 M; 29.7 N, 29.6 RW, 29.6 M

[56] References Cited

UNITED STATES PATENTS

| | | | |
|---|---|---|---|
| 3,536,518 | 10/1970 | Drelich | 427/283 |
| 3,539,434 | 11/1970 | Spaulding | 260/29.6 |
| 3,578,485 | 5/1971 | Imoto et al. | 427/361 |
| 3,594,210 | 7/1971 | Drelich | 428/211 |
| 3,647,507 | 3/1972 | Ashcraft | 427/288 |
| 3,649,330 | 3/1972 | Drelich | 427/288 |
| 3,650,805 | 3/1972 | Imoto et al. | 427/342 |
| 3,674,726 | 7/1972 | Kirk | 260/29.7 P |
| 3,706,595 | 12/1972 | Drelich et al. | 427/288 |
| 3,720,562 | 3/1973 | Drelich | 156/291 |

*Primary Examiner*—Michael R. Lusignan
*Assistant Examiner*—William H. Schmidt

[57] ABSTRACT

Methods of applying stable synthetic resin compositions to porous [ material ] *materials* the synthetic resin composition comprising: (1) a synthetic resin; (2) a polyvalent metal complex coordination compound; and (3) a water-soluble, ionically active ammonium or alkali metal salt of an acid capable of being chemically converted into an ionically inactive polyvalent metal salt of said acid by chemical reaction and precipitation or sequestration of said polyvalent metal salt, and substantially immediately destroying the stability of the synthetic resin compositions to precipitate the resin on the porous materials under controlled migration conditions.

16 Claims, 1 Drawing Figure

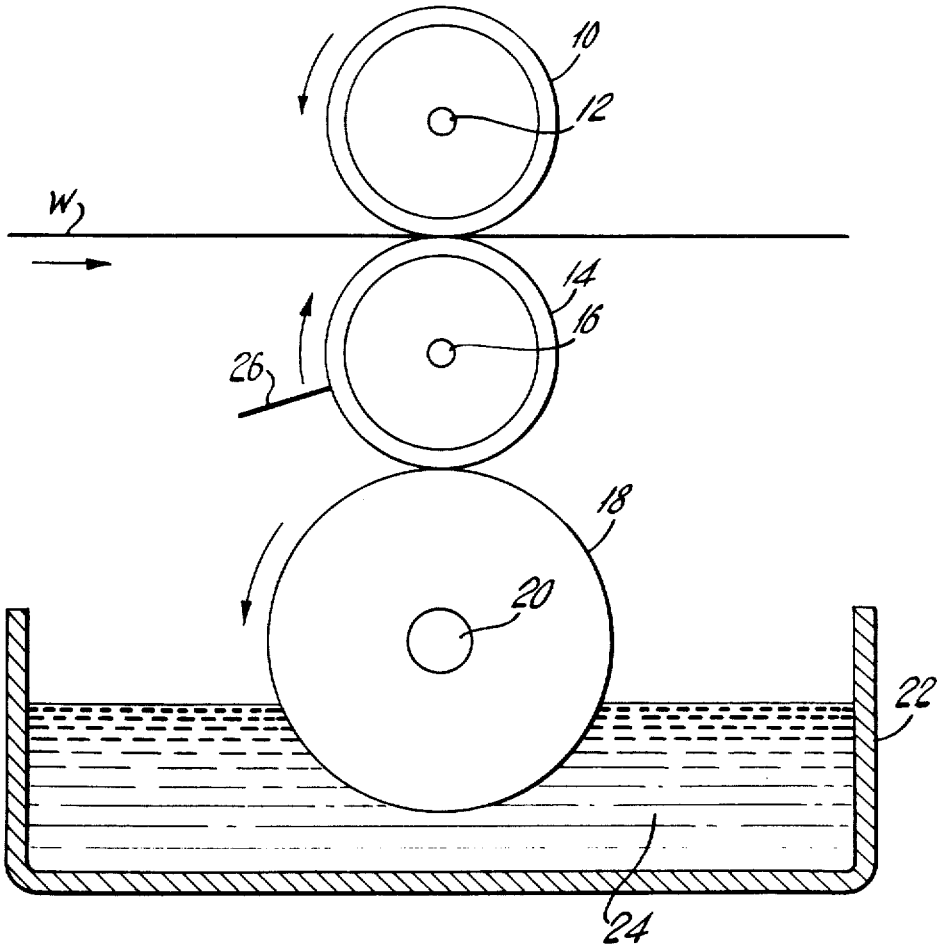
10
12
W
14
16
26
18
20
22
24

SYNTHETIC RESIN COMPOSITIONS AND METHODS OF UTILIZING THE SAME

Matter enclosed in heavy brackets [ ] appears in the original patent but forms no part of this reissue specification; matter printed in italics indicates the additions made by reissue.

GENERAL BACKGROUND OF THE INVENTION

The present invention relates to synthetic resin compositions and to methods of utilizing the same. More particularly, the present invention relates to synthetic resin compositions and to methods of applying such synthetic resin compositions to porous or absorbent materials and controlling their spreading, diffusing, or migrating thereon or their penetrating therein. Even more particularly, the present invention is concerned with the so-called bonded, "nonwoven" textile fabrics, i.e., fabrics produced from textile fibers without the use of conventional spinning, weaving, knitting or felting operations. Although not limited thereto, the invention is of primary importance in connection with nonwoven fabrics derived from "oriented" or carded fibrous webs composed of textile-length fibers, the major proportion of which are oriented predominantly in one direction.

Typical of such fabrics are the so-called "MASSLINN" nonwoven fabrics, some of which are described in greater particularity in U.S. Pat. Nos. 2,705,687 and 2,705,688, issued Apr. 5, 1955, to D. R. Petterson et al. and I. S. Ness et al., respectively.

Another aspect of the present invention is its application to nonwoven fabrics wherein the textile-length fibers were originally predominantly oriented in one direction but have been recognized and rearranged in predetermined designs and patterns of fabric openings and fiber bundles. Typical of such latter fabrics are the so-called "KEYBAK" bundled nonwoven fabrics, some of which are described in particularity in U.S. Pat. Nos. 2,862,251 and 3,033,721, issued Dec. 2, 1958 and May 8, 1962, respectively, to F. Kalwaites.

Still another aspect of the present invention is its application to nonwoven fabrics wherein the textile-length fibers are disposed at random by air-laying techniques and are not predominantly oriented in any one direction. Typical nonwoven fabrics made by such procedures are termed "isotropic" nonwoven fabrics and are described, for example, in U.S. Pat. Nos. 2,676,363 and 2,676,364, issued Apr. 27, 1954 to C. H. Plummer et al.

And still another aspect of the present invention is its application to nonwoven fabrics which comprise textile-length fibers and which are made basically by conventional or modified aqueous papermaking techniques such as are described in greater particularity in pending patent application Ser. No. 4,405, filed Jan. 20, 1970 by P. R. Glor and A. H. Drelich. Such fabrics are also basically "isotropic" and generally have like properties in all directions.

The conventional base starting material for the majority of these nonwoven fabrics is usually a fibrous web comprising any of the common textile-length fibers, or mixtures thereof, the fibers varying in average length from approximately ⅜ inch to about 2½ inches. Exemplary of such fibers are the natural fibers such as cotton and wool and the synthetic or man-made cellulosic fibers, notably rayon or regenerated cellulose.

Other textile-length fibers of a synthetic or man-made origin may be used in various proportions to replace either partially or perhaps even entirely the previously named fibers. Such other fibers include: polyamide fibers such as nylon 6, nylon 66, nylon 610, etc.; polyester fibers such as "Dacron," "Fortrel" and "Kodel;" acrylic fibers such as "Acrilan," "Orlon" and "Creslan;" modacrylic fibers such as "Verel" and "Dynel;" polyolefinic fibers derived from polyethylene and polypropylene; cellulose ester fibers such as "Arnel" and "Acele"; polyvinyl alcohol fibers; etc.

These textile-length fibers may be replaced either partially or entirely by fibers having an average length of less than about ½ inch and down to about ¼ inch. These fibers, or mixtures thereof, are customarily processed through any suitable textile machinery (e.g., a conventional cotton card, a "Rando-Webber," a papermaking machine, or other fibrous web producing apparatus) to form a web or sheet of loosely associated fibers, weighing from about 100 grains to about 2,000 grains per square yard or even higher.

If desired, even shorter fibers, such as wood pulp fibers or cotton linters, may be used in varying proportions, even up to 100 percent, where such shorter length fibers can be handled and processed by available apparatus. Such shorter fibes have lengths less than ¼ inch.

The resulting fibrous web or sheet, regardless of its method of production, is then subjected to at least one of several types of bonding operations to anchor the individual fibers together to form a self-sustaining web. One method is to impregnate the fibrous web over its entire surface area with various well-known bonding agents, such as natural or synthetic resins. Such over-all impregnation produces a nonwoven fabric of good longitudinal and cross strength, acceptable, durability and washability, and satisfactory abrasion resistance. However, the nonwoven fabric tends to be somewhat stiff and board-like, possessing more of the properties and characteristics of paper or board than those of a woven or knitted textile fabric. Consequently, although such over-all impregnated nonwoven fabrics are satisfactory for many uses, they are still basically unsatisfactory as general purpose textile fabrics.

Another well-known bonding method is to print the fibrous webs with intermittent or continuous straight or wavy lines, or areas of binder extending generally transversely or diagonally across the web and additionally, if desired, along the fibrous web. The resulting nonwoven fabric, as exemplified by a product disclosed in the Goldman U.S. Pat. No. 2,039,312 and sold under the trademark, "MASSLINN," is far more satisfactory as a textile fabric than over-all impregnated webs in that the softness, drape and hand of the resulting nonwoven fabric more nearly approach those of a woven or knitted textile fabric.

The printing of the resin binder on these nonwoven webs is usually in the form of relatively narrow lines, or elongated rectangular, triangular or square areas, or annular, circular, or elliptical binder areas which are spaced apart a predetermined distance which, at its maximum, is preferably slightly less than the average fiber length of the fibers constituting the web. This is based on the theory that the individual fibers of the fibrous web should be bound together in as few places as possible.

The nominal surface coverage of such binder lines or areas will vary widely depending upon the precise properties and characteristics of softness, drape, hand and strength which are desired in the final bonded product. In practice, the nominal surface coverage can be designed so that it falls within the range of from about 10 percent to about 50 percent of the total surface of the final product. Within the more commercial aspects of the present invention, however, nominal surface coverages of from about 12 percent to about 40 percent are preferable.

Such bonding increases the strength of the nonwoven fabric and retains substantially complete freedom of movement for the individual fibers whereby the desirable softness, drape and hand are obtained. This spacing of the binder lines and areas has been accepted by the industry and it has been deemed necessarily so, if the stiff and board-like appearance, drape and hand of the over-all impregnated nonwoven fabrics are to be avoided.

The nonwoven fabrics bonded with such line and area binder patterns have had the desired softness, drape and hand and have not been undesirably stiff or board-like. However, such nonwoven fabrics have also possessed some disadvantages.

For example, the relatively narrow binder lines and relatively small binder areas of the applicator (usually an engraved print roll) which are laid down on the fibrous web possess specified physical dimensions and inter-spatial relationships as they are initially laid down. Unfortunately, after the binder is laid down on the wet fibrous web and before it hardens or becomes fixed in position, it tends to spread, diffuse or migrate whereby its physical dimensions are increased and its inter-spatial relationships decreased. And, at the same time, the binder concentration in the binder area is lowered and rendered less uniform by the migration of the binder into adjacent fibrous areas. One of the results of such migration is to make the surface coverage of the binder areas increase whereby the effect of the intermittent bonding approaches the effect of the overall bonding. As a result, some of the desired softness, drape and hand are lost and some of the undesired properties of harshness, stiffness and boardiness are increased.

Various methods have been proposed to prevent or to at least limit such spreading, diffusing or migration tendencies of such intermittent binder techniques.

For example, U.S. Pat. No. 3,009,822, issued Nov. 21, 1961 to A. H. Drelich et al., discloses the use of a nonmigratory regenerated cellulose viscose binder which is applied in intermittent fashion to fibrous webs under conditions wherein migration is low and the concentration of the binder in the binder area is as high as 35 percent by weight, based on the weight of the fibers in these binder areas. Such viscose binder possesses inherently reduced spreading, diffusing and migrating tendencies, thereby increasing the desired softness, drape and hand of the resulting nonwoven fabric. This viscose binder has found acceptance in the industry but the use of other more versatile binders has always been sought.

Resins, or polymers as they are often referred to herein as interchangeable terms, are high molecular weight organic compounds and, as used herein, are of a synthetic or man-made origin. These synthetic or man-made polymers have a chemical structure which usually can be represented by a regularly repeating small unit, referred as a "mer," and are formed usually either by an addition or a condensation polymerization of one or more monomers. Examples of addition polymers are the polyvinyl chlorides, the polyvinyl acetates, the polyacrylic resins, the polyolefins, the synthetic rubbers, etc. Examples of condensation polymers are the polyurethanes, the polyamides, the polyesters, etc.

Of all the various techniques employed in carrying out polymerization reactions, emulsion polymerization is one of the most commonly used. Emulsion polymerized resins, notably polyvinyl chlorides, polyvinyl acetates, carboxylated styrene butadiene rubbers, and polyacrylic resins, are widely used throughout many industries. Such resins are generally produced by emulsifying the monomers, stabilizing the monomer emulsion by the use of various surfactant systems, and then polymerizing the monomers in the emulsified state to form a stabilized resin polymer. The resin polymer is usually dispersed in an aqueous medium as discrete particles of colloidal dimensions (1 to 2 microns diameter or smaller) and is generally termed throughout the industry as a "resin dispersion," or a "resin emulsion" or "latex."

Generally, however, the average particle size in the resin dispersion is in the range of about 0.1 micron (or micrometer) diameter, with individual particles ranging up to 1 or 2 microns in diameter and occasionally up to as high as about 3 or 5 microns in size. The particle size of such colloidal resin dispersions vary a great deal, not only from one resin dispersion to another but even within one resin dispersion itself.

The amount of resin binder solids in the resin colloidal aqueous dispersion varies from about 1/10 percent solids by weight up to about 60 percent by weight or even higher solids, generally dependent upon the nature of the monomers used, the nature of the resulting polymer resin, the surfactant system employed, and the conditions under which the polymerization was carried out.

These resin colloidal dispersions, or resin emulsions, or latexes, may be anionic, non-ionic, or even polyionic and stable dispersions are available commercially at pH's of from about 2 to about 11.

As will be pointed out in greater detail, such resin dispersions are used in the present inventive concept at alkaline pH ranges. Various alkaline reagents, such as ammonia, are therefore added to bring the pH out of the acid range.

The amount of resin which is applied to the porous or absorbent material varies within relatively wide limits, depending upon the resin itself, the nature and character of the porous or absorbent materials to which the resins are being applied, its intended use, etc. A general range of from about 4 percent by weight up to about 50 weight percent by weight, based on the weight of the porous or absorbent material, is satisfactory under substantially all uses. Within the more commercial limits, however, a range of from about 10 percent to about 30 percent by weight, based on the weight of the porous or absorbent material, is preferred.

Such resins have also found use in the coating industries for the coating of knitted fabrics, woven fabrics, paper, paper products, leather, and other materials. The resins are also used as adhesives for laminating films, sheets and like materials or for bonding fibrous webs. These resins have also found wide use as additives in the manufacture of paper, the printing industry, the painting industry, the decorative printing of textiles, and in other industries.

In most instances, the resin is colloidally dispersed in water and, when applied from the aqueous medium to a porous or absorbent sheet material which contains additional water is carried by the water until the water is evaporated or otherwise driven off. If it is desired to place the resin only on the surface of the wet porous or absorbent sheet material and not to have the resin penetrate into the porous or absorbent sheet material, such is usually not possible inasmuch as diffusion takes place between the aqueous colloidal resin and the water in the porous material. In this way, the colloidal resin tends to spread into and throughout the porous material and does not remain merely on its surface.

Or, if it is desired to deposit the resin in a specific intermittent print pattern, such as is used in bonding nonwoven fabrics, the aqueous colloid tends to diffuse, spread or migrate and to wick along the individual fibers and to carry the resin with it beyond the confines of the nominal intermittent print pattern. As a result, although initially placed on the nonwoven fabric in a specific intermittent print pattern, the ultimate pattern goes far beyond that due to the spreading of migration which takes place due to the diffusion of the water and the resin, until the water is evaporated or otherwise driven off.

We have discovered new resin binder compositions containing polymers colloidally dispersed in aqueous media and new methods of applying such resin binder compositions to porous or absorbent material, as enumerated herein, whereby the resins are applied in a controlled, relatively nonmigrating manner. If it is desired that the resin be placed only on the surface of the porous or absorbent material, our compositions and methods will allow this to be done. Furthermore, if it is desired that the resin be impregnated throughout the material, from one surface to the other surface, again, our compositions and methods will allow this to be done.

SPECIFIC BACKGROUND OF THE INVENTION

In copending, commonly-assigned patent applications Ser. No. 65,880 filed Aug. 21, 1970, now U.S. Pat. No. 3,720,562 which issued Mar. 13, 1973, and Ser. No. 66,003 filed Aug. 21, 1970, now abandoned, and Ser. No. 109,026 filed Jan. 22, 1971, now U.S. Pat. No. 3,706,595 which issued Dec. 19, 1972, there are disclosed various synthetic resin compositions and methods of utilizing the same by application to porous or absorbent materials. Basically, these methods disclose applying stable synthetic resin compositions under alkaline conditions to porous or absorbent materials which were previously treated and wetted with controlled concentrations or amounts of acidic media, aqueous media, or simply water. When the synthetic resin compositions were applied to the pretreated porous or absorbent materials, their stability was altered and destroyed by the resulting altered acidic or dilutive conditions and they immediately coagulated and precipitated on the porous or absorbent materials under controlled migration conditions.

[ " ] More specifically, U.S. Pat. No. 3,706,595 discloses methods of applying stable synthetic resin compositions as described herein and having an alkaline pH to porous materials and controlling the migration of such stable synthetic resin compositions on such porous materials by destroying the stability of such synthetic resin compositions by diluting the same substantially immediately after being applied to such porous materials. [ " ]

[ " ] And, also more specifically, U.S. Pat. No. 3,720,562 discloses methods of applying stable synthetic resin compositions as described herein and having an alkaline pH to porous materials and controlling the migration of such stable synthetic resin compositions on such porous materials by destroying the stability of such synthetic resin compositions by acidifying the same substantially immediately after being applied to such porous materials. [ " ]

THE METHODS

Normally, the methods disclosed in these patent applications and in the present case involve the use of standard or conventional apparatus, such as described in FIG. 9 of U.S. Pat. No. 3,009,822. Such methods employ an adjustable upper rotatable back-up roll and an adjustable lower rotatable engraved print roll or applicator roll, with the porous or absorbent materials passing under adjustable pressure through the nip therebetween. In contact with the applicator roll was a lowermost rotatable pick-up roll partially immersed in a bath of the synthetic resin composition, which pick-up roll picked up the synthetic resin composition and transferred it to the applicator roll which applied it to the porous or absorbent materials.

THE APPARATUS

A typical arrangement of such apparatus is shown in the FIGURE for illustrative but not for limitative purposes. In this FIGURE, there is shown an adjustable upper rotatable back-up roll 10, rotating on a rotatable shaft 12, in adjustably controlled pressure contact with a lower rotatable engraved print roll or applicator roll 14 rotating on a rotatable shaft 16. In contact with the applicator roll 14 is a lowermost pick-up roll 18 rotating on a rotatable shaft 20 and being partially immersed in a bath 22 of the synthetic resin composition, which pick-up roll 18 picks up the synthetic resin composition 24 and transfers it to the applicator roll 14 which applies it to a porous or absorbent material W passing through the adjustable pressure nip of back-up roll 10 and applicator roll 14. All these rolls are adjustable whereby the pressure applied to the porous or absorbent material W is adjusted to control the amount of pick-up of the synthetic resin composition 24 on the porous or absorbent material W. A doctor blade 26 is employed to prevent build-up of the resin latex on the pick-up roll 18. This apparatus is generally conventional and standard and other equivalent forms of apparatus are of use.

PRIOR OPERATING DIFFICULTIES

On occasion, it has been noted that the synthetic resin composition lost its stability and thickened or prematurely coagulated and precipitated in the bath 22 itself, prior to application to the porous or absorbent material W. As a result, operating difficulties were consequently occasionally encountered.

The premature coagulation and precipitation was evidenced primarily by a thickening or "setting-up" of the synthetic resin composition in the bath, particularly during the running of the operation.

Also, in some cases, it has been noted that a synthetic resin composition having a viscosity, for example, [ a ] *of* 1,000 centipoises, when originally prepared, thickened to a viscosity of 20,000 centipoises or higher in a period of 1 week storage, prior to plant operation. A comparable synthetic resin composition, when protected by the application of the present invention, thickened only slightly to a viscosity of 1,040 centipoises.

It is a primary purpose of the present inventive concept to prevent such undesirable unstability, thickening and "setting-up" and premature coagulation and precipitation of the synthetic resin compositions during storage and during actual manufacturing operations. It is a further purpose of our invention to permit the formulation of more effective and versatile resin compositions.

GENERAL STATEMENT OF THE INVENTION

It has been discovered that such primary purpose and other advantages and benefits to be described hereinafter are realized by adding to the synthetic resin compositions described in said patent applications controlled amounts of a stabilizing and anti-coagulating and precipitating agent comprising a water-soluble, ionically active ammonium or alkali metal salt of an acid capable of being chemically converted into an ionically inactive polyvalent metal salt of said acid by chemical reaction and precipitation or sequestration of said polyvalent metal salt.

It has not been established beyond any doubt but it is believed that relatively small amounts of polyvalent metal cations spontaneously ionize away from the polyvalent metal complex coordination compound after formulation and during storage before use and that these relatively small amounts of polyvalent metal cations "trigger" the premature thickening, "setting-up", coagulation or precipitation in the bath prior to application to the porous or absorbent materials.

It is also believed that such undesirable premature coagulation and precipitation by the relatively small amounts of polyvalent cations is promoted and accelerated by unspecified amounts of acidic media, aqueous media, or simply water, which are pressed out of the porous materials as they pass through the nip of the back-up roll and applicator roll to drain downwardly into the synthetic resin composition in the bath. This, of course, changes the pH and/or concentration of the complex coordination compound whereby its stability is changed.

The addition of the stabilizing and anti-coagulating and anti-precipitating agent serves to render the liberated polyvalent metal cations innocuous and ionically inactive by chemical reaction and precipitation or sequestration of the polyvalent metal cations. The action of the stabilizing and anti-coagulating agent is thus actually a scavenging action. In this way, the synthetic resin is unaffected and the viscosity of the synthetic resin composition is relatively stabilized.

In order to understand and explain the probable mechanism of the actions taking place, it is instructive to show a typical equilibrium reaction involving a divalent complex metal compound:

$$M^{++} + xNH_4OH \rightleftarrows [M(NH_3)_x]^{++} + xH_2O \qquad (1)$$

or $$[[M(NH_3)_x][H_2O]/[M]^{++}[NH_4OH]^x = k]$$

$$\frac{[M(NH_3)_x^{++}][H_2O]^x/[M^{++}][NH_4OH]^x = k}{Vc} \qquad (2)$$

Prior to this invention, problems were sometimes encountered by the premature liberation of the $M^{++}$ cation which caused premature thickening or coagulation of the resin component in the binder formulation. This liberation of the metal cation can be triggered by an increase in concentration of $H_2O$ by dilution or a decrease in concentration of $NH_4OH$ by dilution, neutralization, or evaporation. The scavenging agents which we have discovered effectively inactivate the liberated $M^{++}$ cation.

Based on simple considerations of reaction kinetics, the removal of $M^{++}$ from the system should shift the equilibrium to continuously form more ionic $M^{++}$ cations to maintain the constancy of the value of the reaction constant k. Unexpectedly and surprisingly, this does not appear to happen, or to happen so slowly that we can increase the stability of a formulation from several hours to many weeks.

THE SYNTHETIC RESIN

The improved synthetic resin compositions of the present invention comprise from about 0.1 percent to about 60 percent by weight on a solids basis of a colloidal synthetic resin and may be of a self cross-linking type, or an externally cross-linking type, or may not be cross-linked.

Specific examples of such colloidal synthetic resins include: *carboxylated synthetic resins* polymers and copolymers of vinyl halides such as plasticized and unplasticized polyvinyl chloride, polyvinyl chloride-polyvinyl acetate, ethylene-vinyl chloride, etc.; polymers and copolymers of vinyl esters such as plasticized and unplasticized polyvinyl acetate, ethylene-vinyl acetate, acrylic-vinyl acetate, etc.; polymers and copolymers of the polyacrylic resins such as ethyl acrylate, methyl acrylate, butyl acrylate, ethyl-butyl acrylate, ethyl hexyl acrylate, hydroxyethyl acrylate, dimethyl amino ethyl acrylate, etc.; polymers and copolymers of the polymethacrylic resins such as methyl methacrylate, ethyl methacrylate, isopropyl methacrylate, butyl methacrylate, etc.; polymers and copolymers of acrylonitrile, methacrylonitrile, acrylamide, N-isopropyl acrylamide, N-methylol acrylamide, methacrylamide, etc.; vinylidene polymers and copolymers, such as polyvinylidene chloride, polyvinylidene chloride-vinyl chloride, polyvinylidene chloride-ethyl acrylate, polyvinylidene chloride-vinyl chloride-acrylonitrile, etc.; polymers and copolymers of polyolefinic resins including polyethylene, polypropylene, ethylene-vinyl chloride and ethylene-vinyl acetate which have been listed previously; the synthetic rubbers such as 1,2-butadiene, 1,3-butadiene, 2-ethyl-1,3-butadiene, high, medium and carboxylated butadiene-acrylonitrile, butadiene-styrene, chlorinated rubber, etc., natural latex; the polyurethanes; the polyamides; the polyesters; the polymers and copolymers of the styrenes including styrene, 2-methyl styrene, 3-methyl styrene, 4-methyl styrene, 4-ethyl styrene, 4-butyl styrene; natural latex; phenolic emulsions, etc.

These resins may be used either as homopolymers comprising a single repeating monomer unit, or they may be used as copolymers comprising two, three, or more different monomer units which are arranged in random fashion, or in a definite ordered alternating fashion, within the polymer chain. Also included within the inventive concept are the block polymers comprising relatively long blocks of different monomer units in a polymer chain and graft polymers comprising chains of one monomer attached to the backbone of another polymer chain.

Other synthetic resins of particular applicability within the principles of the present inventive concept are colloidal synthetic resins containing a coordinating ligand.

The coordinating ligand is normally an acidic or proton donor group, especially those containing terminal hydroxy groups. Examples of hydroxy-containing coordinating ligands are: hydroxy —OH; carboxy —COOH; sulfino —SO(OH) sulfo—$SO_2$(OH); sulfonoamino —$NHSO_2$(OH); aci-nitro =NO(OH); hydroxyamino —NHOH; hydroxyimino =NOH; etc. It is to be observed that these hydroxy-containing radicals contain a hydrogen atom which is capable of dissociating to form an $H^+$ ion or proton.

The colloidal synthetic resins possessing a hydroxy-containing coordinating ligand are obtained by copolymerizing: (1) from about 92 percent by weight to about 99 percent by weight of a monomer or a mixture of monomers of the group comprising vinyl halide, vinyl ester, or vinyl ether monomers including, for example, vinyl chloride, vinyl acetate and vinyl ethyl ether; olefin monomers such as ethylene and propylene; acrylic and methacrylic monomers including, for example, ethyl acrylate, ethyl hexyl acrylate, methyl acrylate, propyl acrylate, butyl acrylate, hydroxyethyl acrylate, dimethyl amino ethyl acrylate, methyl methacrylate, ethyl methacrylate, isopropyl methacrylate, butyl methacrylate, acrylonitrile, methacrylonitrile, acrylamide, N-isopropyl acrylamide, N-methylol acrylamide, methacrylamide; vinylidene monomers such as vinylidene chloride; diene monomers including, for example 1,2-butadiene, 1,3-butadiene, 2-ethyl-1,3-butadiene; styrene monomers including, for example, styrene, 2-methyl styrene, 3-methyl styrene, 4-methyl styrene, 4-ethyl styrene, 4-butyl styrene; and other polymerizable monomers; and (2) a relatively small amount, on the order of from about 1 percent by weight to about 8 percent by weight, of an unsaturated acid containing a terminal hydroxy group such as the $\alpha,\beta$-unsaturated carboxylic acids including acrylic acid, methacrylic acid, fumaric acid, maleic acid, itaconic acid, crotonic acid, isocrotonic acid, angelic acid, tiglic acid, etc. Anhydrides of such acids, where they exist, are also of use. Other $\alpha,\beta$-unsaturated acids are of use and include 2-sulfoethyl methacrylate, styrene sulfonic acid, vinyl phosphonic acid, etc.

It is to be appreciated that more than one monomer may be included in the polymerization with the $\alpha,\beta$-unsaturated acid. An outstanding example of the use of more than one monomer is the polymerization of butadiene and styrene with an $\alpha,\beta$-unsaturatd acid such as acrylic acid, methacrylic acid, fumaric acid, maleic acid, or itaconic acid. Anhydrides, for example, maleic anhydride, are also of use.

THE WATER-SOLUBLE, POLYMERIC CARBOXYLIC THICKENER

Also of application within the principles of the present inventive concept, either in lieu of the previously mentioned synthetic resins or in addition thereto, are water-soluble, polymeric carboxylic thickeners which are included in the resin composition in amounts of from about 0.05 percent by weight to about 10 percent by weight.

The water soluble polymeric carboxylic thickener may be selected from a relatively large group of such materials which include, for example: polyacrylic acid; polymeric crotonic acid; copolymers of vinyl acetate and crotonic acid; copolymers of vinyl acetate and acrylic acid; polyacrylic acid-polyacrylamide copolymers; polymethacrylic acid; polymethacrylic acid-polyacrylamide copolymers; carboxymethyl cellulose; carboxyethyl cellulose; carboxypropyl cellulose; polycarboxy-methyl hydroxyethyl cellulose; alginic acid; polymers of acrylic acid and acrylic acid esters; polymers of $\alpha,\beta$-unsaturated carboxylic acids such as itaconic acid; etc. These water soluble, polymeric, carboxylic thickeners may be used in their acid forms but normally it is preferred to use their water-soluble, neutralized salts, that is, their sodium, potassium, lithium, ammonium, or like water soluble salts.

THE SURFACTANTS

On occasion, anionic and nonionic surfactants are added to the synthetic resin composition to create, enhance or to augment the "triggering" action which initiates the coagulation and precipitation of the synthetic resin. Such anionic and nonionic surfactants are included in the synthetic resin composition in amounts ranging from about 0.01 percent to about 5 percent by weight, based on the weight of the synthetic resin solids.

Typical examples of such surfactants are: the alkyl aromatic sulfonic acids, alkyl sulfonic acids, the carboxylic acids, and other surfactants such as, for example, dodecyl benzene sulfonate, octyl benzene sulfonate, hexyl benzene sulfonate, octadecyl benzene sulfonate, octyl sulfonate, hexyl sulfonate, dodecyl sulfonate, octadecyl sulfonate, and the sodium and potassium fatty acid soaps containing from 5 to 18 carbon atoms. Other anionic surfactants include sodium p-1-methyl alkyl benzene sulfonates in which the alkyl group contains from 10 to 16 carbon atoms, the sodium di-n-alkyl sulfosuccinates in which the alkyl groups contain from 4 to 12 carbon atoms, the potassium n-alkyl malonates in which the alkyl group contains from 8 to 18 carbon atoms, the potassium alkyl tricarboxylates in which the alkyl group contains from 6 to 14 carbon atoms, the alkyl betaines in which the alkyl group contains from 6 to 14 carbon atoms, the ether alcohol sulfates, sodium n-alkyl sulfates, containing from 6 to 18 carbon atoms, etc.

Non-ionic surfactants which are useful within the principles of the present invention possess non-ionizing hydrophilic groups, and include such surface-active agents as fatty acid mono-esters of polyglycerol and pentaerythritol. Specific examples are glycerol monostearate, glycerol mono-laurate, pentaeryltritol monostearate, pentaerytritrol, mono-laurate, etc. Others include glycol esters of fatty acids, prepared by treating the acid with ethylene oxide. Specific useful surfactants include: nonyl phenoxy poly (ethyleneoxy) ethanol; nonyl phenol polyglycol ether alcohol; polyethylene glycol monolaurate; polyoxyethylene oleyl ether; ethylene oxide condensates of castor oil; polyglycol palmitate amide; ethoxylated alkyl phenol; lauric diethanolamide; octyl phenoxy polyethoxy ethanol; difunctional block-polymers terminating in primary hydroxy groups; etc.

The specific surfactant which is selected for use in the resin composition does not relate to the essence of the invention. It is merely necessary that it possess the necessary properties and characteristics to carry out its indicated function of stabilizing the resin composition prior to the time that coagulation and precipitation of the resin is required. Additionally, in the event that it is desired that the surfactant assist in or promote the coagulation and precipitation function, then it must possess the necessary anionic groups, as described hereinbefore, which are capable of reaction due to the presence of the metal cations released from the metal complex coordination compound.

THE POLYVALENT METAL COMPLEX COORDINATION COMPOUND

The polyvalent metal complex coordination compound is included in the resin composition in an amount equal to from about 0.01 percent by weight to about 5 percent by weight, based on the weight of the previously mentioned synthetic resin or polymer solids.

Examples of polyvalent metal complex coordination compounds of particular applicability when the porous or absorbent materials are pretreated with acidic media are:

ammonium carbonato zirconate $(NH_4)_3[ZrOH(CO_3)_3]\cdot H_2O$ ammonium heptafluoro zirconate $(NH_4)_3[ZrF_7]$ potassium tetracyano zincate $K_2[Zn(CN)_4]$ sodium tetrahydroxo zincate $Na_2[Zn(OH)_4]$ sodium tetrahydroxo aluminate $Na_2[Al(OH)_4]$ potassium trioxalato aluminate $K_3[Al(C_2O_4)_3]$ As defined herein, a metal complex coordination compound is one of a number of types of metal complex compounds, usually made by addition of organic or inorganic atoms or groups to simple inorganic compounds containing the metal atom. Coordination compounds are therefore essentially compounds to which atoms or groups are added beyond the number possible of explanation on the basis of electrovalent linkages, or the usual covalent linkages, wherein each of the two atoms linked donate one electron to form the duplet. In the cases of the coordination compounds, the coordinate atoms or groups are linked to the atoms of the coordination compound, usually by coordinate valences, in which both the electrons in the bond are furnished by the linked atoms of the coordinated group.

Other examples of polyvalent metal complex coordination compounds of more universal utility but of particular applicability when the porous or absorbent materials are pretreated with aqueous media are:

hexammine chromium chloride $[Cr(NH_3)_6]Cl_3\cdot H_2O$ pentammine chloro chromium chloride $[Cr(NH_3)_5Cl]Cl_2$ hexammine nickel chloride $[Ni(NH_3)_6]Cl_2$ tetrammine dinitro cobalt nitrate $[Co(NH_3)_4(NO_2)_2](NO_3)_3$ hexammine cobalt chloride $[Co(NH_3)_6]Cl_3$ hexammine cobalt iodide $[Co(NH_3)_6]I_2$ hexammine cobalt nitrate $[Co(NH_3)_6](NO_3)_3$ hexammine cobalt sulfate $[Co(NH_3)_6]SO_4$ hexammine cobalt bromide $[Co(NH_3)_6]Br_2$ hexammine nickel bromide $[Ni(NH_3)_6]Br_2$ hexammine nickel chlorate $[Ni(NH_3)_6](ClO_3)_2$ hexammine nickel iodide $[Ni(NH_3)_6]I_2$ hexammine nickel nitrate $[Ni(NH_3)_6](NO_3)_2$ tetrammine zinc carbonate $[Zn(NH_3)_4]CO_3$ tetrammine zinc sulfate $[Zn(NH_3)_4]SO_4$ tetrammine zinc nitrate $[Zn(NH_3)_4](NO_3)_2$ diammine zinc chloride $[Zn(NH_3)_2]Cl_2$ tetrammine zinc chloride $[Zn(NH_3)_4]Cl_2$ diammine copper acetate $[Cu(NH_3)_2](C_2H_3O_2)_2$ tetrammine copper sulfate $[Cu(NH_3)_4]SO_4\cdot H_2O$ tetrammine copper hydroxide $[Cu(NH_3)_4](OH)_2$ ammonium tetra thiocyanato diammine chromate $NH_4[CR(NCS)_4(NH_3)_2]H_2O$ hexammine chromium chloride $[Cr(NH_3)_6]Cl_3H_2O$ chloro pentammine chromium chloride $[Cr(NH_3)_5Cl]Cl_2$ As defined herein, a metal ammine complex coordination compound is one of a number of types of metal complex compounds, usually made by addition of organic or inorganic atoms or groups such as ammonia ($NH_3$) to simple inorganic compounds containing the metal atom. Coordination compounds are therefore essentially compounds to which atoms or groups are added beyond the number possible of explanation on the basis of electrovalent linkages, or the usual covalent linkages, wherein each of the two atoms linked donate one electron to form the duplet. In the case of the coordination compounds, the coordinated atoms or groups are linked to the atoms of the coordination compound, usually by coordinate valences, in which both the electrons in the bond are furnished by the linked atoms of the coordinated group.

THE WATER-SOLUBLE, IONICALLY-ACTIVE SALT

The water-soluble, ionically active ammonium or alkali metal salt of an acid (to be defined more particularly hereinafter) is present in the resin composition in an amount of from about 5 percent to about 90 percent molecular equivalent (stoichiometric basis) of the polyvalent metal which is present and which is to be precipitated or sequestered. That is to say, for example, if there is one mole of the polyvalent metal present, then there is from about 0.05 to 0.90 mole of the water-soluble, ionically active ammonium or alkali metal salt present.

Ammonium and alkali metal salts of acids naturally are selected from the group consisting of ammonium, lithium, sodium and potassium salts. Of these, ammonium is preferred. As a matter of fact, in many cases where there is sufficient ammonium or alkali metal hydroxide in the resin composition, the agent may be added in the acid form rather than in the salt form and the water-soluble, ionically active ammonium salt will be formed, in situ. The above salts generally consist of the $NH_4$, Na, etc., and salts of acids listed below.

THE ACIDS

Examples of acids suitable for application within the principles of the present invention are: inorganic mineral acids such as ortho-phosphoric acid, hypophosphoric acid, metaphosphoric acid, triphosphoric acid, tetraphosphoric acid, chromic acid, orthoboric acid, metaboric acid, tetraboric acid, etc.; monobasic aliphatic organic acids, preferably having at least 10 carbon atoms, such as capric acid, lauric acid, myristic acid, palmitic acid, stearic acid, oleic acid, linoleic acid, linolenic acid, etc.; dicarboxylic aliphatic organic acids such as oxalic acid, malonic acid, succinic acid, glutaric acid, adipic acid, pimelic acid, suberic acid, etc.; aliphatic hydroxy acids such as citric acid, glycolic acid, lactic acid, malic acid, tartaric acid, etc.; monocarboxylic aromatic organic acids such as benzoic acid, o-toluic acid, m-toluic acid, p-toluic acid, phenylacetic acid, cinnamic acid, etc.; hydroxy aromatic organic acids such as salicylic acid, m-hydroxy benzoic acid, p-hydroxy benzoic acid, mandelic acid, etc.; dicarboxylic and polycarboxylic aromatic organic acids such as phthalic acid, isophthalic acid, terephthalic acid, gluconic acid, etc.

Many of these acids are frequently also classified as chelating agents and possess the ability to form chelated compounds wherein the polyvalent metal cations which are associated with them are rendered ionically inactive and remain in solution in sequestered form.

Other acids which are more truly considered as chelating agents are also suitable for application within the principles of the present invention. Such chelating agents include: ethylene diamine tetraacetic acid (EDTA); ethylene diamine tetrapropionic acid (EDTPA); hydroxyethyl ethylene diamine triacetic acid (HEDTA); ammonia triacetic acid (NTA); N-hydroxyethyl diethylene triamine tetraacetic acid (HDTTA); etc.

The invention will be further described by reference to the following Examples wherein there are disclosed preferred embodiments of the present invention. However, it is to be appreciated that such Examples are illustrative but not limitative of the broader aspects of the inventive concept.

EXAMPLE I

A resin binder formulation suitable for bonding nonwoven fabrics having the following composition is prepared:

| | Pounds |
|---|---|
| GAF 500-19A carboxylated butadiene-styrene resin (50% solids) GAF Corporation | 12.5 |
| Water | 6.0 |
| Anti-foam agent | 0.12 |
| External curing agent for resin (80%) | 0.55 |
| Acrylic acid copolymer thickener Rohm and Haas Acrysol 51 (10%) (ammonium salt) | 1.30 |
| Zinc tetrammine chloride (169 ml.) - 10% Zn Content | 0.42 |
| Plasticizer | 0.60 |
| Anionic surfactant (25%) | [0.25] *0.05* |

The values in pounds in the above Example and in all other Examples herein represent the weight in pounds of the constituent or the solution added. To obtain the real weight of the added constituent, if in a solution, you must multiply by the percent solids or concentration of the constitutent in the solution.

The viscosity of the above-described composition is 1,000 centipoises, as initially prepared. The pH is on the alkaline side (9.0). A one-pound sample is exposed to air for seven days and the viscosity undesirably increases to 20,000 centipoises. Another one-pound sample is protected by the addition of 0.01 pound of a 25 percent solution of diammonium phosphate. The one-pound sample of the "protected" composition is exposed to air for seven days and the viscosity increases to only 1,040 centipoises. There is no excessive thickening or setting-up of the resin latex. The beneficial results of the diammonium phosphate as an anti-thickening and anti-coagulating agent are notable.

EXAMPLE II

A resin binder formulation suitable for bonding non-woven fabrics having the following composition is prepared:

| | Pounds |
|---|---|
| GAF-243 carboxylated butadiene-styrene resin (50% solids) GAF Corporation | 2.8 |
| Water | 0.9 |
| Anti-foam agent | 0.03 |
| External curing agent for resin (80%) | 0.11 |
| Acrylic acid copolymer thickener Rohm and Haas Acrysol 51 (10%) (ammonium salt) | 0.18 |
| Zinc tetrammine chloride (33 ml) - 10% Zn content | 0.083 |
| Plasticizer | 0.15 |
| Anionic surfactant (25%) | 0.03 |
| Corrosion inhibitor (20%) | 0.03 |

The viscosity of the above-described composition is 560 centipoises, as initially prepared. The pH is alkaline (9.2). A 0.7-pound sample is exposed to air for 24 hours and the viscosity undesirably increases to 3,200 centipoises. Another 0.7-pound sample is protected by the addition of 1 ml. of a 25 percent solution of diammonium phosphate. The 0.7-pound sample of the "protected" composition is exposed to air for 24 hours and the viscosity increases to only 1,060 centipoises. There is no excessive thickening or setting-up of the resin latex. The beneficial results of the diammonium phosphate as an anti-thickening and anti-coagulating agent are notable.

EXAMPLE III

The procedures of Example II are followed substantially as set forth therein with the exception that the 0.7-pound sample is protected by the addition of 1 ml. of a 25 percent solution of ammonium citrate which increases the viscosity to 760 centipoises. The sample of the "protected" composition is exposed to air for 24 hours and the viscosity increases further to only 1,060 centipoises. There is no excessive thickening or setting-up of the "protected" resin latex. The beneficial results of the ammonium citrate as an anti-thickening and anti-coagulating agent is notable.

EXAMPLE IV

The procedures of Example II are followed substantially as set forth therein with the exception that the 0.7-pound sample is protected by the addition of 1 ml. of a 25 percent solution of the ammonium salt of ethylene diamine tetraacetic acid. The sample of the "protected" composition is exposed to air for 24 hours and the viscosity increases moderately to only 1,400 centipoises. There is no excessive thickening or setting-up of the "protected" resin latex. The beneficial results of the ethylene diamine tetraacetic acid as an anti-thickening and anti-coagulating agent are notable.

EXAMPLE V

The procedures of Example IV are followed substantially as set forth therein with the exception that ethylene diamine tetraacetic acid is added rather than its ammonium salt. The dispersion is sufficiently ammoniacal, that the ammonium salt is formed in situ, and subsequently protects the dispersion from coagulation and precipitation. No thickening or setting-up of the "protected" resin latex is noted. The results are generally comparable.

EXAMPLE VI

The procedures of Example II are followed substantially as set forth therein with the exception that the 0.7-pound sample is protected by the addition of 1 ml. of a 12½ percent solution of ammonium oxalate. The sample of the "protected" composition is exposed to air for 24 hours and the viscosity increases to only 1,600 centipoises. This increase in viscosity is significantly below the unprotected sample and is still acceptable. The beneficial results of such a small amount of ammonium oxalate as an anti-thickening and anti-coagulating agent are notable.

EXAMPLE VII

A resin binder formulation suitable for bonding non-woven fabrics having the following composition is prepared:

| | Pounds |
|---|---|
| GAF-243 carboxylated butadiene-styrene resin (50% solids) GAF Corporation | 2.5 |
| Water | 0.08 |
| Anti-foam agent | 0.03 |
| External curing agent for resin (80%) | 0.10 |
| Acrylic acid copolymer thickener Rohm and Haas Acrysol 51 (10%) (ammonium salt) | 0.15 |
| Zinc tetrammine chloride (30 ml.) - 10% Zn content | 0.074 |
| Plasticizer | 0.13 |
| Anionic surfactant (25%) | 0.03 |
| Corrosion inhibitor (20%) | 0.03 |

The viscosity of the above-described composition is 7,400 centipoises, as initially prepared. The pH is alkaline (9.3). A 0.7-pound sample is exposed to air for 24 hours and the viscosity undesirably increases to 20,000 centipoises. Another 0.7-pound sample is protected by the addition of 4 ml. of a 25 percent solution of diammonium phosphate. The sample of the "protected" composition is exposed to air for 24 hours, and the viscosity decreases. There is no evidence of any thickening or setting-up of the resin latex. The beneficial results of the diammonium phosphate as an anti-thickening and anti-coagulating agent are notable.

EXAMPLE VIII

A resin binder formulation suitable for bonding non-woven fabrics having the following composition is prepared:

| | Pounds |
|---|---|
| GAF-243 carboxylated butadiene-styrene resin (50% solids) GAF Corporation | 2.5 |
| De-ionized water | 0.8 |
| Anti-foam agent | 0.03 |
| External curing agent for resin (80%) | 0.10 |
| Acrylic acid copolymer thickener Rohm and Haas Acrysol 51 (10%) (ammonium salt) | 0.15 |
| Zinc tetrammine chloride (169 ml.) - 10% Zn content | [0.074] *0.42* |
| Plasticizer | 0.13 |
| Anionic surfactant (25%) | 0.03 |

The viscosity of the above-described composition is 7,400 centipoises, as initially prepared. The pH is alkaline (9.4). A 0.7-pound sample is exposed to air for 24 hours and the viscosity increases to 20,000 centipoises. Another 0.7-pound sample is protected by the addition of 1 ml. of a 25 percent solution of diammonium phosphate. The 0.7-pound sample of the "protected" composition is exposed to air for 25 hours and the viscosity decreases to 2,800 centipoises. The beneficial results of the diammonium phosphate as an anti-thickening and anti-coagulating agent are notable.

EXAMPLE IX

A fibrous card web weighing about 750 grains per square yard and comprising 100 percent bleached rayon fibers 1.5 denier and 1 9/16 inches in length is intermittently print bonded by the rotogravure process using an engraved roll having a diamond print pattern therein. Apparatus such as illustrated in the FIGURE is used. There are approximately four lines per inch in each of two directions, crossing to form a diamond pattern and each set of lines is approximately 30° to the cross axis of the fibrous web. The width of each line, as measured on the engraved print roll, is 0.024 inch. The composition by weight of the resin binder formulation used for the intermittent print bonding is:

1. 15 pounds of a 50 percent solids latex of GAF-243 terpolymer of 46 percent butadiene, 51 percent styrene and approximately 2 percent alpha-beta unsaturated carboxylic acid;
2. 5 pounds of de-ionized water;
3. 0.15 pound of an anti-foam agent;
4. 0.60 pound of 80 percent solution of an external curing agent for the resin;
5. 0.75 pound of a plasticizer for the resin;
6. 0.85 pound of a 10 percent solution of a polymeric thickening agent — Rohm & Haas Acrysol 51, a copolymer of acrylic acid (ammonium salt)
7. 0.15 pound of an anionic surfactant (25 percent)
8. 0.2 pound of blue coloring
9. 0.15 pound of an anti-corrosion agent
10. 190 ml. (0.47 pound) of zinc tetraammine chloride To a 5.6-pound sample of the above composition is added 0.03 pounds of a 25 percent solution of diammonium phosphate. The viscosity of the resulting composition, as initially prepared, is 400 centipoises. The pH is 9.

The fibrous card web is pretreated or premoistened with a large amount of water to an extent of 250 percent moisture, based on the weight of the fibers in the web. The extra dilution with water is sufficient to destroy the stability of the resin dispersion when it is applied to the fibrous web by a rotogravure printing process and the resin dispersion immediately coagulates and precipitates in place on the very wet fibrous web. The printed web is then processed, treated and cured as described in the previous referred-to patent applications.

The width of the binder line in the finished bonded nonwoven product is not more than about 0.048 inch which represents a controlled total migration of not more than about 100 percent.

The control over the bonding operation and production procedure is very good. At no time is there any evidence of premature coagulation or precipitation in the bath. There is substantially no thickening or setting-up of the synthetic resin dispersion in the bath prior to being applied to the nonwoven fabric.

The resulting bonded nonwoven fabric has excellent strength, excellent softness, and excellent drape and hand.

EXAMPLE X

The procedures of Example IX are followed substantially as set forth therein with the exception that an increased amount of 0.06 pound of the 25 percent solution of diammonium phosphate is added to the 5.6-pound sample of the resin binder composition. The pH of the resulting composition is 9.2 and the viscosity is 440 centipoises. The results are generally comparable to those obtained in Example IX and the resulting bonded nonwoven fabric has excellent strength, excellent softness and excellent drape and hand.

EXAMPLE XI

The procedures of Example IX are followed substantially as set forth therein with the exception that a further increased amount of 0.12 pound of 25 percent solution of diammonium phosphate is added to a 5.6-pound sample of the resin binder composition. The pH of the resulting dispersion is 9.2 and its viscosity is 360 centipoises.

There is substantially no excessive thickening, coagulating, or premature coagulation of the resin latex in the bath. Calculation of the amount of diammonium phosphate, however, indicates that there is more than its stoichiometric equivalent present and the excess diammonium phosphate interferes seriously subsequently upon printing of the [web] *wet* fibrous web and control is lost over the migration and lateral spread of the binder.

EXAMPLE XII

The procedurs of Example IX are followed substantially as set forth therein with the following synthetic resin formulation:

| | Pounds |
|---|---|
| GAF-243 carboxylated butadiene-styrene resin (50% solids) GAF Corporation | 300 |
| Anti-foam agent | 4 |
| De-ionized water | 100 |
| Resin curing agent (80%) | 12 |
| Resin plasticizer | 15 |
| Acrylic acid co-polymer thickening agent Rohm and Haas Acrysol 51 (10%) (ammonium salt) | 15 |
| Zinc tetrammine chloride - 10% Zn | 6.12 |
| Anionic surfactant | 0.50 |
| Anti-corrosion agent | 0.8 |
| Diammonium phosphate (25%) | 1.5 |

The control of the application of the protected synthetic resin composition to the fibrous web is very good. The viscosity of the synthetic resin composition at the outset is 600 centipoises and this value does not change materially throughout the operation of the binder application. There is no evidence of any premature coagulation or precipitation of the resin binder composition in the bath and there is no undesirable thickening or setting-up of the resin prior to being applied to the fibrous web. The resulting bonded nonwoven fabric has excellent strength, excellent softness, and excellent drape and hand. It is acceptable to the industry.

EXAMPLE XIII

The procedures of Example I are followed substantially as set forth therein with the exception that the following synthetic resin formulation is used.

| | Pounds |
|---|---|
| Air Flex 510 ethylene vinyl acetate co-polymer (50% solids) | 2.5 |
| Water | 0.68 |
| Anti-foam agent | 0.03 |
| Zinc tetrammine chloride 17.5 ml | 0.044 |
| Acrylic acid copolymer thickener (10%) (ammonium salt) | 0.47 |
| Plasticizer for resin | 0.25 |
| Corrosion inhibitor | 0.025 |
| External curing agent for resin | 0.05 |

The viscosity of the dispersion as initially prepared is 880 centipoises and the pH is 9.5. A sample of the resin is exposed to air and the viscosity thereof increases to 20,000 centipoises in 24 hours.

A 0.7-pound sample of the resin dispersion is protected by the addition thereof of 1 ml. of a 25 percent solution of diammonium phosphate. After 24 hours, the viscosity of the resin dispersion is 840 centipoises. After 48 hours, the viscosity increases to 1,600 centipoises.

The beneficial results of the addition of diammonium phosphate are notable.

To another 0.7-pound sample of the above resin is added 1 ml. of a 25 percent solution of ammonium citrate. After 24 hours, the viscosity of the dispersion is 2,000 centipoises. The beneficial results of the addition of ammonium citrate are notable.

EXAMPLE XIV

The procedures of Example IX are followed substantially as set forth therein with the exception that *the* zinc tetrammine chloride is replaced by:

1. Zinc tetrammine sulfate;
2. Zinc tetrammine carbonate;
3. Zinc tetrammine nitrate.

The results are generally comparable to the results obtained in Example IX. The bonded nonwoven fabric is processed with no production difficulties. There is no thickening or setting-up of the resin latex in the applicator bath. There is no premature coagulation or precipitation in the bath of resin latex. The resulting bonded nonwoven fabric has excellent strength, excellent softness, and excellent hand and drape.

EXAMPLE XV

The procedures of Example I are followed substantially as set forth therein with the exception that the diammonium phosphate is replaced by:

1. ammonium benzoate;
2. ammonium palmitate
3. the sodium salt of ethylene diammine tetraacetic acid;
4. ammonium succinate;
5. sodium phosphate.

The results are generally comparable to the results obtained in Example I. There is no excessive thickening or setting-up of the resin latex. The beneficial results of the anti-thickening and anti-coagulating agent are notable.

EXAMPLE XVI

The procedures of Example IX are followed substantially set forth therein with the exception that the carboxylated butadiene styrene resin is replaced by:

1. National Starch 4260, a polyacrylic resin;
2. Geon 576 polyvinyl *chloride* resin;
3. National Starch 22K11 polyvinyl acetate resin.

The results are generally comparable to the results obtained in Example IX. There is no excessive thickening or setting-up of the resin latex in the bath. The beneficial results of the anti-thickening and anti-coagulating resin are notable. The properties of the bonded nonwoven fabric are generally comparable to those obtained in Example IX.

EXAMPLE XVII

The procesures of Example IX are followed substantially as set forth therein with the exception that the polymeric thickener (Acrysol 51) is replaced by the:

1. sodium salt of Hercules carboxymethylcellulose designated as grade 7H3S;
2. sodium salt of Hercules carboxymethylcellulose designated as grade 7M;
3. sodium salt of Hercules carboxymethylcellulose designated as grade 7L2;
4. Kelco Kelgin F alginate (sodium salt)

The results are generally comparable to the results obtained in Example IX. There is no excessive thickening or setting-up of the resin latex in the bath. There is no evidence of any premature coagulation or precipitation. The resulting bonded nonwoven fabric has excellent strength, excellent softness, and excellent drape and hand. It is acceptable to industry.

EXAMPLE XVIII

The procedures of Example I are followed substantially as set forth therein with the exception that the following composition is used:

| | Pounds |
|---|---|
| GAF-243 Carboxylated butadiene styrene resin (50% solids) GAF Corporation | 1.0 |
| Water | 0.3 |
| Acrylic acid copolymer thickener Rohm and Haas Acrysol 51 (10%) (ammonium salt) | 0.1 |
| Ammonium zirconyl carbonate (10 ml. - 10%[$ZnO_2$])$ZrO_2$ | 0.02 |
| Plasticizer | 0.05 |
| Anionic surfactant (25%) | 0.01 |

The viscosity of the above-described composition is 1200 centipoises as initially prepared. The pH is alkaline (pH 9.3). Upon exposure to air for 4 days, the viscosity undesirably increases to 1920 centipoises.

A 0.67-pound sample of the above resin composition is protected by the addition of 1.5 ml. of a 25 percent solution of diammonium phosphate. At the end of four days exposure to air, the viscosity has risen only slightly to 1,400 centipoises.

There is no excessive thickening or setting-up of the resin latex composition. The beneficial results of the diammonium phosphate as an anti-thickening and anti-coagulating agent are notable.

EXAMPLE XIX

The procedures of Example I are followed substantially as set forth therein with the exception that the following composition is used:

| | Pounds |
|---|---|
| GAF-243 carboxylated butadiene-styrene resin (50% solids) GAF Corporation | 1.0 |
| Water | 0.3 |
| Acrylic acid copolymer thickener Rohm and Haas Acrysol 51 (10%) (ammonium salt) | 0.05 |
| Ammonium zirconyl carbonate (15 ml. - 10% [$ZnO_2$]) $ZrO_2$ | 0.03 |
| Plasticizer | 0.05 |
| Anionic surfactant (25%) | 0.01 |

The viscosity of the above-described composition is 240 centipoises. The composition is alkaline and has a pH of 9.3. Upon exposure to air for 4 days, the viscosity of the composition increases to 520 centipoises.

A 0.65-pound sample of the above resin composition is protected by the addition of 2 ml. of 25 percent diammonium phosphate. The viscosity of the resulting composition is 240 centipoises which, after four days, rises 320 centipoises.

There is no excessive thickening or setting-up of the resin latex composition. The beneficial results of the diammonium phosphate as an anti-thickening and anti-coagulating agent are notable.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

We claim:

1. A method of applying a stable synthetic resin composition having an alkaline pH to porous materials and controlling the migration thereon which comprises: applying to porous materials a stable synthetic resin composition having an alkaline pH and comprising: (1) from about 0.1 percent to 60 percent by weight on a solids basis of a *carboxylated* synthetic resin; (2) from about 0.01 percent to about 5 percent by weight, based on the weight of said synthetic resin of a polyvalent metal complex coordination compound; and (3) a water-soluble, ionically-active ammonium or alkali metal salt of an acid capable of being chemically converted into an ionically-inactive polyvalent metal salt of said acid by chemical reaction and precipitation or sequestration of said polyvalent metal salt, said salt being capable of sequestering or precipitating the metal in said polyvalent metal complex coordination compound and being present in an amount of from about 5 percent to about 90 percent molecular equivalent on a stoichiometric basis of said polyvalent metal and substantially immediately destroying the stability of said synthetic resin composition to coagulate and precipitate the resin on said porous materials under controlled migration conditions.

2. A method of applying a stable synthetic resin composition having an alkaline pH to porous materials and controlling the migration thereon as defined in claim 1 wherein the stability of said synthetic resin composition is destroyed by diluting the same substantially immediately after it is applied to said porous materials.

3. A method of applying a stable synthetic resin composition having an alkaline pH to porous materials and controlling the migration thereon as defined in claim 1 wherein the stability of said synthetic resin composition is destroyed by acidifying the same substantially immediately after it is applied to said porous materials.

4. A method of applying a stable synthetic resin composition having an alkaline pH to porous materials and controlling the migration thereon as defined in claim 1 wherein the coordination compound is a polyvalent metal ammine complex coordination compound.

5. A method of applying a stable synthetic resin composition having an alkaline pH to porous materials and controlling the migration thereon as defined in claim 1 wherein the water-soluble, ionically-active salt of an acid is an ammonium salt of phosphoric acid.

6. A method of applying a stable synthetic resin composition having an alkaline pH to porous materials and controlling the migration thereon as defined in claim 1 wherein the water-soluble, ionically-active salt of an acid is diammonium phosphate.

7. A method of applying a stable synthetic resin composition having an alkaline pH to porous materials and controlling the migration thereon as defined in claim 1 wherein the water-soluble, ionically-active salt of an acid is an ammonium salt of a dicarboxylic aliphatic acid.

8. A method of applying a stable synthetic resin composition having an alkaline pH to porous materials and controlling the migration thereon as defined in claim 1 wherein the water-soluble, ionically-active salt of an acid is ammonium oxalate.

9. A method of applying a stable synthetic resin composition having an alkaline pH to porous materials and controlling the migration thereon as defined in claim 1 wherein the water-soluble, ionically-active salt of an acid is an ammonium salt of an aliphatic hydroxy acid.

10. A method of applying a stable synthetic resin composition having an alkaline pH to porous materials and controlling the migration thereon as defined in claim 1 wherein the water-soluble, ionically-active salt of an acid is ammonium citrate.

11. A method of applying a stable synthetic resin composition having an alkaline pH to porous materials and controlling the migration thereon as defined in claim 1 wherein the water-soluble, ionically-active salt of an acid is an ammonium salt of a monocarboxylic aromatic acid.

12. A method of applying a stable synthetic resin composition having an alkaline pH to porous materials and controlling the migration thereon as defined in claim 1 wherein the water-soluble, ionically-active salt of an acid is ammonium benzoate.

13. A method of applying a stable synthetic resin composition having an alkaline pH to porous materials and controlling the migration thereon as defined in claim 1 wherein the water-soluble, ionically-active salt of an acid is an ammonium salt of a monobasic aliphatic organic acid having at least 10 carbon atoms.

14. A method of applying a stable synthetic resin composition having an alkaline pH to porous materials and controlling the migration thereon as defined in claim 1 wherein the water-soluble, ionically-active salt of an acid is ammonium palmitate.

15. A method of applying a stable synthetic resin composition having an alkaline pH to porous materials and controlling the migration thereon which comprises: applying to porous materials a stable synthetic resin composition having an alkaline pH and comprising: (1) from about 0.1 percent to about 60 percent by weight on a solids basis of a synthetic resin; (2) from about 0.01 percent to about 5 percent by weight, based on the weight of said synthetic resin of a polyvalent metal complex coordination compound; (3) a water-soluble, ionically-active ammonium or alkali metal salt of an acid capable of being chemically converted into an ionically inactive polyvalent metal salt of said acid by chemical reaction and precipitation or sequestration of said polyvalent metal salt, said salt being capable of sequestering or precipitating the metal in said polyvalent metal complex coordination compound and being present in an amount of from about 5 percent to about 90 percent molecular equivalent on a stoichiometric basis of said polyvalent metal, and (4) a water-soluble polymeric carboxylic thickener; and substantially immediately destroying the stability of said synthetic resin composition to coagulate and precipitate the resin on said porous materials under controlled migration conditions.

16. A method of applying a stable synthetic resin composition having an alkaline pH to porous materials and controlling the migration thereon which comprises: applying to porous materials a stable synthetic resin composition having an alkaline pH and comprising: (1) from about 0.1 percent to about 60 percent by weight on a solids basis of a synthetic resin; (2) from about 0.01 percent to about 5 percent by weight, based on the weight of said synthetic resin of a polyvalent metal complex coordination compound; (3) a water-soluble, ionically-active ammonium or alkali metal salt of an acid capable of being chemically converted into an ionically-inactive polyvalent metal salt of said acid by chemical reaction and precipitation or sequestration of said polyvalent metal salt, said salt being capable of sequestering or precipitating the metal in said polyvalent metal complex coordination compound and being present in an amount of from about 5 percent to about 90 percent molecular equivalent on a stoichiometric basis of said polyvalent metal; (4) a water-soluble polymeric carboxylic thickener; and (5) a surfactant, and substantially immediately destroying the stability of said synthetic resin composition to coagulate and precipitate the resin on said porous materials under controlled migration conditions.

* * * * *

UNITED STATES PATENT AND TRADEMARK OFFICE

CERTIFICATE OF CORRECTION

PATENT NO. : Re. 28,957

DATED : Reissued September 7,1976

INVENTOR(S) : Drelich et al.

It is certified that error appears in the above-identified patent and that said Letters Patent are hereby corrected as shown below:

In Column 1, line 37, "recognized" should read -- reorganized --.

In Column 1, line 59, after "Ser. No. 4,405," insert -- now abandoned --.

In Column 5, line 31, "material" should read -- materials --.

In Column 7, line 39, "polyvalent cations" should read -- polyvalent metal cations --.

UNITED STATES PATENT AND TRADEMARK OFFICE

CERTIFICATE OF CORRECTION

PATENT NO. : Re. 28,957

DATED : Reissued September 7,1976

INVENTOR(S) : Drelich et al.

It is certified that error appears in the above-identified patent and that said Letters Patent are hereby corrected as shown below:

In Column 16, line 26, "0.08" should read -- 0.8 --.

Signed and Sealed this

*Fourteenth* Day of *February 1978*

[SEAL]

*Attest:*

RUTH C. MASON
*Attesting Officer*

LUTRELLE F. PARKER
*Acting Commissioner of Patents and Trademarks*